United States Patent
Leppäaho et al.

(10) Patent No.: US 12,549,020 B2
(45) Date of Patent: Feb. 10, 2026

(54) VOLTAGE BALANCING CIRCUIT FOR SERIES CONNECTED CAPACITOR BANKS OR VOLTAGE CELLS AND VARIABLE FREQUENCY DRIVE FOR DRIVING AN ELECTRIC MOTOR OR POWER CONVERTER FOR SUPPLYING A LOAD WITH A VOLTAGE BALANCING CIRCUIT

(71) Applicant: Danfoss Power Electronics A/S, Gråsten (DK)

(72) Inventors: Oskari Leppäaho, Krusaa (DK); Orges Gjini, Roscoe, IL (US)

(73) Assignee: DANFOSS POWER ELECTRONICS A/S, Gråsten (DK)

( * ) Notice: Subject to any disclaimer, the term of this patent is extended or adjusted under 35 U.S.C. 154(b) by 558 days.

(21) Appl. No.: 18/167,937

(22) Filed: Feb. 13, 2023

(65) Prior Publication Data
US 2023/0261479 A1    Aug. 17, 2023

(30) Foreign Application Priority Data
Feb. 14, 2022  (DE) .......................... 102022103410.0

(51) Int. Cl.
*H02J 7/00* (2006.01)
*H02M 1/08* (2006.01)

(52) U.S. Cl.
CPC .............. *H02J 7/0016* (2013.01); *H02M 1/08* (2013.01)

(58) Field of Classification Search
CPC .......... H02J 7/0016; H02J 7/345; H02M 1/08; H02M 7/4833; H02M 1/32; H02M 1/088

USPC .......................................................... 320/116
See application file for complete search history.

(56) References Cited

U.S. PATENT DOCUMENTS

| | | | | |
|---|---|---|---|---|
| 3,797,038 A | * | 3/1974 | Brander ................. | G11B 20/08 |
| 4,388,500 A | * | 6/1983 | Regan ................. | H04M 19/005 |
| | | | | 379/345 |
| 6,172,549 B1 | * | 1/2001 | Gilbert ..................... | G06G 7/20 |
| | | | | 327/349 |
| 6,738,277 B2 | * | 5/2004 | Odell .................... | H02J 7/0016 |
| | | | | 363/52 |
| 6,806,686 B1 | * | 10/2004 | Thrap ..................... | H02J 7/345 |
| | | | | 320/118 |

(Continued)

FOREIGN PATENT DOCUMENTS

| | | | |
|---|---|---|---|
| DE | 10 2015 112 524 A1 | 2/2017 | |
| DE | 20 2018 002 177 U1 | 6/2018 | |
| WO | WO-0122554 A1 * | 3/2001 | ............ H02M 7/487 |

*Primary Examiner* — M Baye Diao
(74) *Attorney, Agent, or Firm* — McCormick, Paulding & Huber PLLC (57) ABSTRACT

A voltage balancing circuit for capacitor banks or voltage cells connected in series. The circuit includes a DC-link with at least two capacitors or voltage cells connected in series and at least two emitter follower balancing circuits connected in parallel. At least one emitter resistor is provided between the emitter of each emitter follower balancing circuit and the mid-point of the DC-link. The gate emitter voltage applied to each emitter follower balancing circuit may be equal to its common gate voltage minus the voltage drop on the corresponding emitter resistor. The invention is also directed at a variable frequency drive for driving an electric motor or a power converter, having a corresponding voltage balancing circuit.

20 Claims, 5 Drawing Sheets

(56) References Cited

U.S. PATENT DOCUMENTS

| | | | | |
|---|---|---|---|---|
| 7,324,034 B2* | 1/2008 | Manganaro | ............ | H03M 1/72 |
| | | | | 341/172 |
| 7,599,167 B2* | 10/2009 | Doljack | ............... | H02J 7/0016 |
| | | | | 365/205 |
| 7,622,888 B2* | 11/2009 | Gjini | .................. | H01M 16/003 |
| | | | | 320/101 |
| 9,350,198 B2* | 5/2016 | Gao | ..................... | H02J 7/0016 |
| 10,181,732 B2* | 1/2019 | Eckert | .................. | H02J 7/0016 |
| 2005/0073452 A1* | 4/2005 | Manganaro | ............ | H03M 1/72 |
| | | | | 341/150 |
| 2007/0053216 A1* | 3/2007 | Alenin | ................... | H02M 3/07 |
| | | | | 363/60 |
| 2014/0139186 A1* | 5/2014 | Gao | ....................... | H02J 7/345 |
| | | | | 320/119 |
| 2015/0295515 A1* | 10/2015 | Zabaleta Maeztu | ......................... | |
| | | | | H02M 7/4837 |
| | | | | 363/71 |
| 2017/0033569 A1* | 2/2017 | Werker | ................ | H02J 7/0014 |

\* cited by examiner

Fig. 1c  State of the art

Fig. 1b  State of the art

Fig. 1a  State of the art

VOLTAGE BALANCING CIRCUIT FOR SERIES CONNECTED CAPACITOR BANKS OR VOLTAGE CELLS AND VARIABLE FREQUENCY DRIVE FOR DRIVING AN ELECTRIC MOTOR OR POWER CONVERTER FOR SUPPLYING A LOAD WITH A VOLTAGE BALANCING CIRCUIT

CROSS-REFERENCE TO RELATED APPLICATION

This application claims foreign priority benefits under 35 U.S.C. § 119 from German Patent Application No. 102022103410.0, filed Feb. 14, 2022, the content of which is hereby incorporated by reference in its entirety.

TECHNICAL FIELD

The present invention pertains to a voltage balancing circuit for capacitor banks or voltage cells connected in series. The circuit comprises a DC-link with at least two capacitors or voltage cells connected in series and at least two emitter follower balancing circuits connected in parallel. At least one emitter resistor is provided between the emitter of each emitter follower balancing circuit and the mid-point of the DC-link. The gate emitter voltage applied to each emitter follower balancing circuit may be equal to its common gate voltage minus the voltage drop on the corresponding emitter resistor. The invention is also directed at a variable frequency drive for driving an electric motor or a power converter, comprising a corresponding voltage balancing circuit.

BACKGROUND

Voltage balancing circuits actively regulate the voltage balance between capacitors or voltage cells connected in series such as battery cells. A problem of known voltage balancing circuits is that the maximum imbalanced current compensated by the circuit is practically limited by the given architecture of the circuit.

SUMMARY

The aim of the invention is to provide an improved voltage balancing circuit and an improved variable frequency drive or power converter, which offer a simple way of adapting the device to various amounts of imbalanced currents.

This aim is achieved by the voltage balancing circuit according to claim 1 and the variable frequency drive or power converter according to claim 10. Preferable embodiments are subject of the dependent claims.

According to claim 1, a voltage balancing circuit for capacitor banks or voltage cells connected in series is provided. It comprises a DC-link with at least two capacitors or voltage cells connected in series and at least two emitter follower balancing circuits connected in parallel. According to the invention, at least one emitter resistor is provided between the emitter of each emitter follower balancing circuit and the mid-point of the DC-link. The gate emitter voltage applied to each emitter follower balancing circuit may be equal to its common gate voltage minus the voltage drop on the corresponding emitter resistor.

This circuit is scalable in the sense that higher imbalance currents can be compensated by placing one or more circuits in parallel. It offers lower cost, better performance and practically unlimited scalability compared to the state of the art. The present invention offers a solution for paralleling unlimited or at least a high number of emitter follower balancing circuits and ensuring good sharing between the parallel circuits and in particular between the parallel elements such as IGBT-s or MOSFET-s, despite parameter differences in the transistor and resistor components used. At the same time, it provides a very accurate balancing function between the in series connected capacitors or voltage cells. The lower count of components and the simplicity of the presently described design contribute towards its enhanced reliability. The presently described circuit can be used in all applications that require in series connections of capacitors or voltage cells like batteries. It provides good balancing at lower costs compared to known solutions.

According to a preferred embodiment of the invention, three, four or more parallel emitter follower balancing circuits are provided. It is therefore easy to scale the circuit by adding some relatively cheap components to it. The increased number of emitter follower balancing circuits may be chosen such that a desired higher imbalance current can be compensated.

According to another preferred embodiment of the invention, at least one common resistor connects the emitter resistors to the negative DC-link side.

According to another preferred embodiment of the invention, the parallel emitter follower balancing circuits comprise IGBTs and/or MOSFETs. The emitter follower is not limited to IGBTs or MOSFETs but can be any type of transistors, say bi-polar, FET, Darlington. Uni-junction transistors may be excluded by the invention.

According to another preferred embodiment of the invention, the capacitor banks or voltage cells comprise battery cells and/or fuel cells and/or capacitors. The term capacitor banks may be therefore understood in a broad sense and may comprise components other than capacitors.

According to a particularly preferred embodiment of the invention, the battery cells and/or fuel cells and/or capacitors are arranged in parallel and/or in series to each other. Accordingly, a considerable number of said components may be provided for enabling the above outlined arrangement.

According to a preferred embodiment of the invention, at least three capacitors or voltage cells are connected in series to each other and/or at least two capacitors or voltage cells are connected in parallel to at least two other capacitors or voltage cells. The number and arrangement of the capacitors or voltage cells may be selected to suit high voltages occurring at the DC-link. Thus, a higher number of relatively cheap and small components can be used for high voltage applications, which would otherwise require more expensive and larger components.

According to another preferred embodiment of the invention, the voltage balancing circuit is integrated in a variable frequency drive for driving an electric motor or in a power converter to supply a load.

The invention is also directed at a variable frequency drive for driving an electric motor or power converter for supplying a load, comprising a voltage balancing circuit.

BRIEF DESCRIPTION OF THE DRAWINGS

Other details and advantages of the invention will be described with reference to the figures. The figures show.

DETAILED DESCRIPTION

Known variable frequency drives (VFD) are based on a voltage-controlled inverter (VCI) topology. This topology requires a stable DC link voltage to supply the inverter. Therefore, a DC-link capacitor bank is commonly provided as an energy storage and a decoupling device between the rectifier and the inverter stages.

Figure 1A:
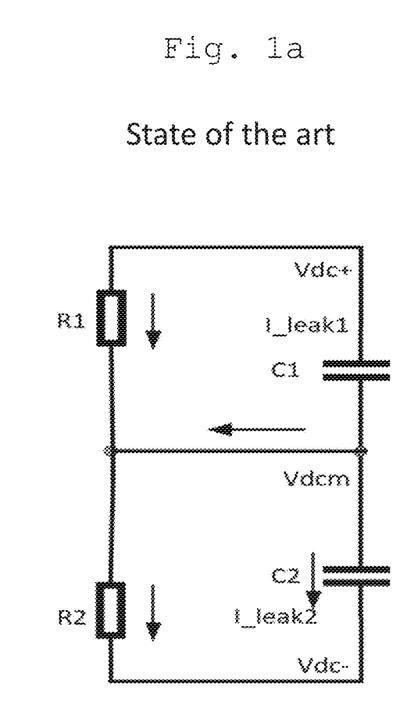
FIG. 1a: balancing of the in series capacitors voltage with in parallel resistors according to the state of the art.

To achieve the needed capacitance value and the voltage required for the DC bank, several capacitors C1, C2 may be connected in parallel and/or series, as shown in FIG. 1a. The in series connection of capacitors C1, C2 is used to achieve the desired DC-link voltage when using capacitors C1, C2 of a lower rated voltage either because higher voltage capacitors C1, C2 do not exist or because the cost and/or performance can be improved with lower voltage rated capacitors C1, C2. Whichever the reason, the series connection of capacitors C1, C2 is a very common practice not only in VFD but also in many other applications such as battery cells and fuel cells or power converters.

It is well known that connecting two or more capacitors C1, C2 in series can lead to an uneven voltage sharing between the individual capacitors C1, C2, even if the capacitors C1, C2 are near identical parts and provided by the same manufacturer. Because of the manufacturing tolerances of the materials and capacitor construction or aging, differences between individual capacitors C1, C2 in capacitance, leakage current etc. always exist. These differences lead to uneven voltage sharing between series connected capacitors C1, C2. As a result, the voltage applied across one capacitor C1, C2 may even exceed its rated voltage and consequently lead to a premature failure of the capacitor C1, C2.

To ensure a balanced sharing between the in series connected capacitors C1, C2, it is common to connect high power resistors R1, R2 in parallel with each capacitor C1, C2. The values of these resistors R1, R2 can be calculated based on the leakage current of the individual capacitors C1, C2 and the maximum tolerance of the leakage current of the capacitors C1, C2. The parallel resistors R1, R2 are a simple solution of the problem, but they turn out to be relatively large in terms of power dissipation. They are not very cost effective in the overall picture of the application. A typical circuit diagram of this known solution is shown in FIG. 1a, where the voltage of in series capacitors C1, C2 is balanced with in parallel resistors R1, R2.

Figure 1B:
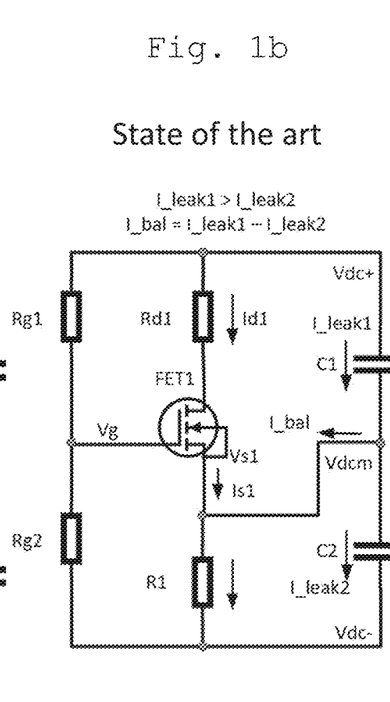
FIG. 1b: active balancing circuit based on emitter follower topology according to the state of the art.

An alternative way to ensure the voltage balance between the capacitors connected in series C1, C2 is shown in FIG. 1b. Here, an active balancing circuit is shown, which is based on emitter follower topology. This design differs from the previously described passive solution of the parallel resistors R1, R2. It represents an active circuit as it is based on active components, i.e. transistors, which adjust their current and/or resistance proportionally to the leakage current differences between the capacitors C1, C2.

When designed properly, active balancing solutions can provide lower power dissipation, better balancing, and an overall more cost-effective solution. Several of these active balancing circuits are known to be used for balancing the voltage of capacitors C1, C2 connected in series as well as other applications, like battery cells, fuel cells etc. connected in series.

Active balancing circuits are known to be based on well-known emitter follower circuits. These circuits may use a high voltage, low current IGBT or Insulated Gate Bipolar Transistor as the main active balancing component. Additionally, they use several resistors R1, Rd1, Rg1, Rg2, which are much smaller and less costly than a passive balancing parallel resistor circuit.

In the circuit of FIG. 1b, reference sign FET1 refers to a transistor such as an IGBT or a MOSFET. The transistor FET1 operates in the active region and therefore the power dissipation in the transistor FET1 can increase to levels that the device package cannot support.

In cases where relatively large capacitor current leakage imbalances need to be compensated by the active balancing circuit, two or more active balancing circuits may be needed. Such a parallel active balancing circuit is shown in the circuit diagram of FIG. 1c.

Figure 1C:
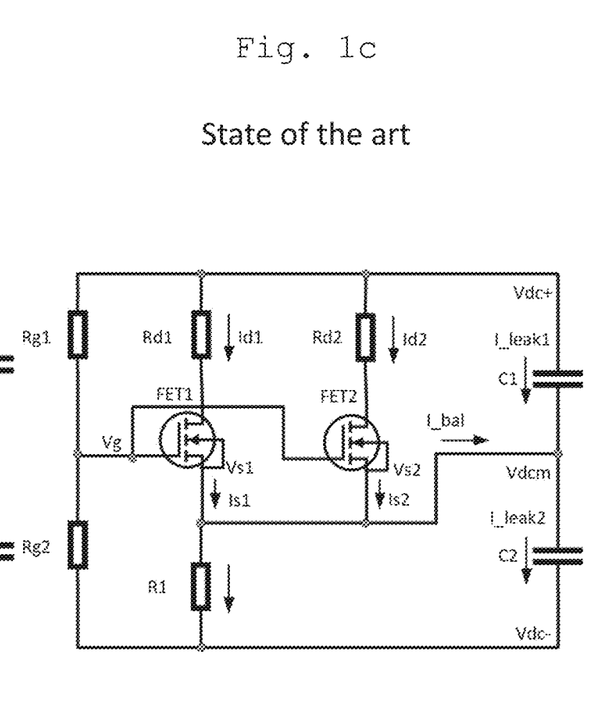
FIG. 1c: paralleling of active balancing circuits according to the state of the art.

Here, the current sharing between the two parallel transistors FET1, FET2 needs to be balanced. It is known that transistors such as IGBT and MOSFET devices are typically designed for high voltage and low current ranges. They are primarily designed for switching operations. The device current is controlled by its gate voltage. When the gate voltage is below the threshold voltage, the current through the device is very small and it takes very little gate voltage above the threshold to place the device in a low resistance state. At the threshold gate voltage level an almost immediate change in the device from off to on occurs. However, for an active balancing circuit, a smoothly controllable "resistor" behaviour of transistors such as IGBT or MOSFET is desired and not a switch behaviour between fully off and fully on states.

When transistors are utilized in the active operation region, very small differences in their threshold gate voltages in the region of millivolts may exist between two otherwise near identical transistors. These differences may cause one transistor to turn on faster and carry almost all the current and the other parallel transistor to carry almost no current. The branch that has the lower threshold voltage transistor will carry more current and dissipate much higher power than the branch with higher threshold gate voltage transistor.

This makes the utilization of two or more circuits in parallel inefficient. The present invention provides a circuit that overcomes the current sharing problem between parallel active balancing circuits and improves the current sharing balance between parallel circuits.

Figure 2:
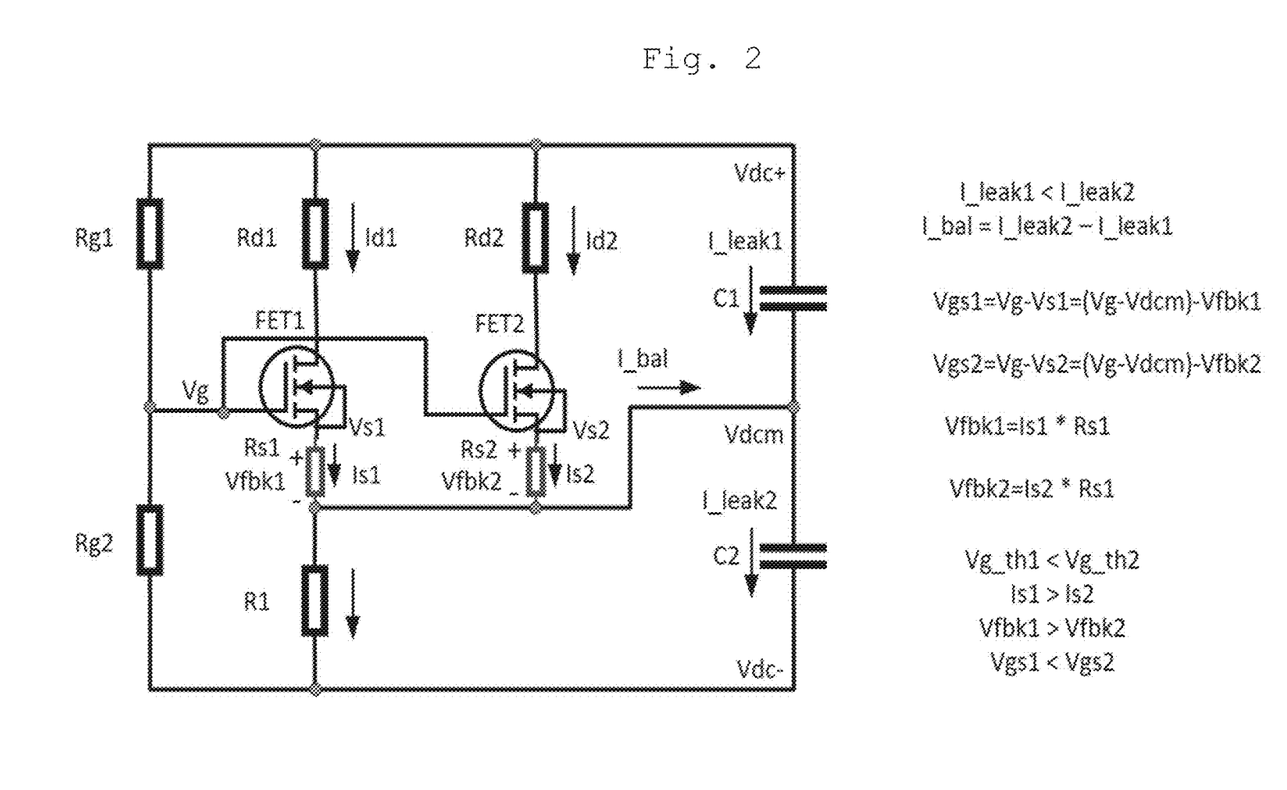
FIG. 2: current sharing self-balancing circuit for in series capacitors voltage active balancing.

FIG. 2 shows a current sharing self-balancing circuit for series capacitors voltage active balancing according to the present invention.

The circuit comprises a DC-link with at least two capacitors or voltage cells C1, C2 connected in series. A mid-point Vdcm of the DC-link is situated between the two capacitors C1, C2. Although reference will be made primarily to capacitors, voltage cells may be used alternatively. The circuit further comprises at least two emitter follower balancing circuits FET1, FET2 connected in parallel with at least one emitter resistor Rs1, Rs2 provided between the emitter of each emitter follower balancing circuit FET1, FET2 and the mid-point Vdcm of the DC-link. The voltages and currents across said emitter resistors Rs1, Rs2 are indicated as Vfbk1, Vfbk2 and Is1, Is2, respectively. To evenly balance the voltage over C1, C2, the value of Rg1 is set to or close to the value of Rg2, meaning Rg1=Rg2. The values of Rg1 and Rg2 may differ slightly. In particular, Rg1 may be smaller than Rg2 to accomodate for the gate voltage of the MOSFET or IGBT. The exact relationship may be described by the following expression:

$$Rg1=(Vdc/(Vgeth+Vdc/2)-1)*Rg2$$

where Vdc is the DC link voltage and Vgeth is the nominal gate emitter threshold voltage of the MOSFET.

The gate emitter voltage applied to each emitter follower balancing circuit FET1, FET2 may be equal to its common gate voltage minus the voltage drop on the corresponding emitter resistor Rs1, Rs2.

The basic architecture of the circuit is chosen such that three, four or more emitter follower balancing circuits FET1, FET2 connected in parallel can be provided easily. However, they are not shown in the figures. If more than two emitter follower balancing circuits FET1, FET2 connected in parallel are used, they may all be integrated within the remainder of the voltage balancing circuit as is presently described with reference to the first two emitter follower balancing circuits FET1, FET2. For example, each of the plurality of emitter follower balancing circuits FET1, FET2 may be connected to the mid-point Vdcm of the DC-link via a corresponding emitter resistor Rs1, Rs2.

In the embodiment of FIG. 2, the two emitter resistors Rs1, Rs2 are not only connected to the mid-point Vdcm of the DC-link but also to the negative DC-link side Vdc-via at least one common resistor R1. Again, if more than two emitter resistors Rs1, Rs2 are used in the voltage balancing circuit, they all may be connected to the negative DC-link side Vdc-via the at least one common resistor R1.

The parallel emitter follower balancing circuits FET1, FET2 may comprise IGBTs and/or MOSFETs and in particular identical IGBTs and/or MOSFETs. The capacitor banks or voltage cells C1, C2 may comprise components such as battery cells and/or fuel cells and/or capacitors, which may be provided in identical pairs and in series and/or parallel connection with respect to each other. Clearly, the series and/or parallel connection of the components may be realized with a substantial number of the named components, which may at the same time be arranged in near identical pairs of series connected components.

The presently described voltage balancing circuit may be integrated in a variable frequency drive. The invention is also directed at a corresponding variable frequency drive for driving an electric motor. The drive comprises a voltage balancing circuit as presently described.

According to FIG. 2, the invention is realized by placing small resistors Rs1, Rs2 between the emitter of each emitter follower balancing circuits FET1, FET2 and the midpoint of the DC-link Vdcm. The emitter follower balancing circuits FET1, FET2 may be presently referred to as transistors FET1, FET2 for simplicity's sake.

These resistors Rs1, Rs2 carry the emitter current of each transistor FET1, FET2 and the gate emitter voltage applied to each transistor FET1, FET2 is equal to the common gate voltage minus the voltage drop on the resistors Rs1, Rs2. If the transistor FET1 has a lower threshold voltage than the second transistor FET2, the common gate emitter voltage applied to both transistors FET1, FET2, i.e. when no emitter resistors Rs1, Rs2 were mounted in FIG. 2, will favour the first transistor FET1 to turn on faster than the second transistor FET2. Consequently, the first transistor FET1 will be carrying the majority of the current.

When the emitter resistors Rs1, Rs2 are mounted as shown in FIG. 2, then the larger current flowing through the first transistor FET1 increases also the voltage drop on the resistor Rs1 placed in series with its emitter. Therefore, the gate emitter voltage applied to the first transistor FET1 is lowered on the one side. In effect, the resistance is increased and the current lowered.

On the other side, the gate emitter voltage applied to the second transistor FET2 is larger than that applied to the first transistor FET1, since the current through the second transistor FET2 and therefore the voltage drop in its emitter resistor Rs2 are small. This way, the first transistor FET1, that has a smaller threshold voltage, also has a smaller voltage applied to its gate emitter than the second transistor FET2.

The circuit of FIG. 2 balances the current between parallel transistors FET1, FET2. The resistors Rs1, Rs2 placed at the emitter of each parallel transistor FET1, FET2 act as a negative closed loop feedback to balance their current sharing. Larger values for the feedback resistors will ensure better balancing but increasing these resistor values will also increase the power loss on them. More importantly, the error in balancing the voltage between series connected capacitors C1, C2 is increased. This is because the emitters of the transistors FET1, FET2 are not connected directly to the mid-point Vdcm of the DC-link, but through resistors Rs1 and Rs2.

Figure 3:
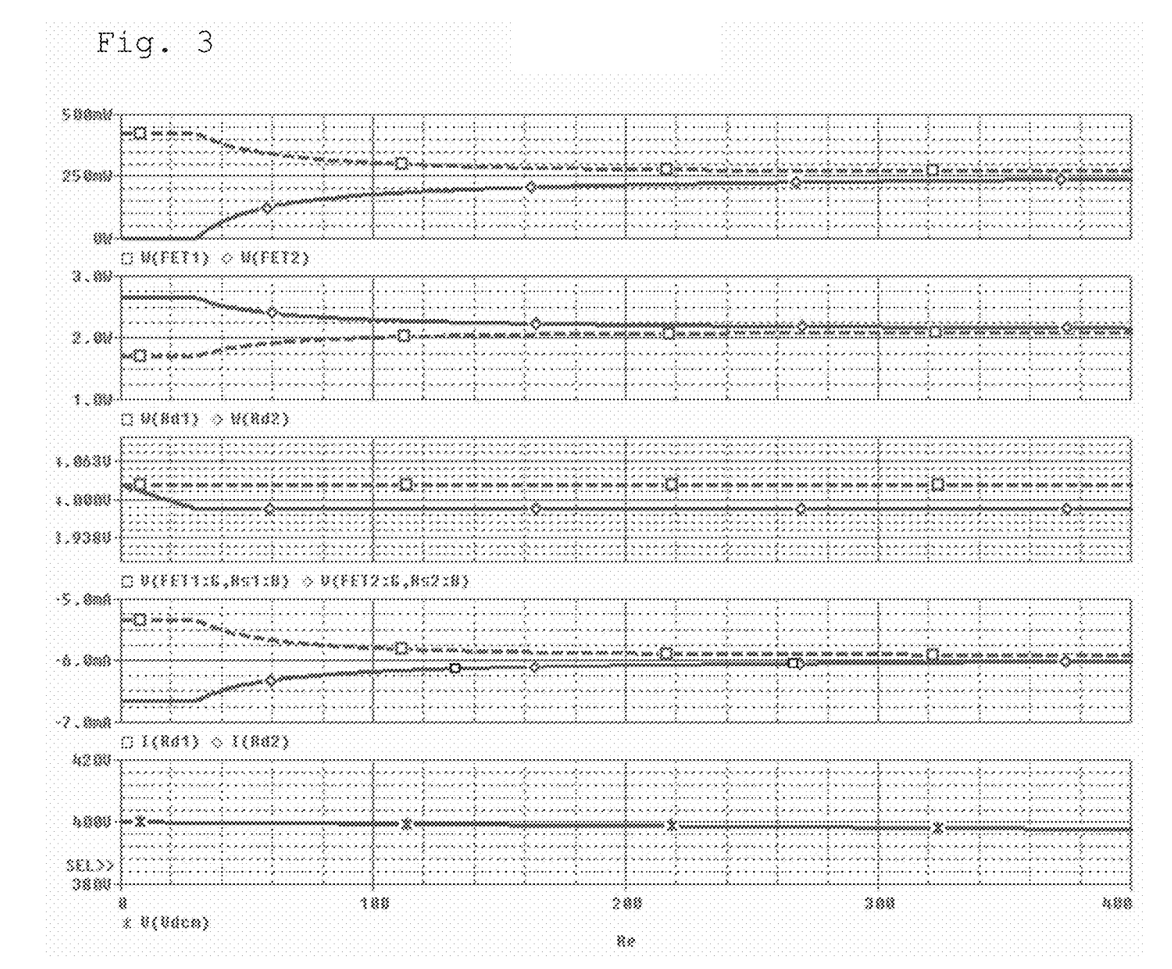
FIG. 3: simulation results of presently described circuit.

FIG. 3 provides simulation results of the circuit in FIG. 2, wherein the series connected capacitors C1, C2 have different leakage currents in parallel with each capacitor C1, C2. As transistors, two MOSFETs have been selected for the simulation, that have slightly different threshold voltages, 3.98V and 4.02V. In the simulation, resistors Rs1, Rs2 are varied simultaneously from 0-400 Ohm.

In FIG. 3, the bottom plot shows the middle point between two series connected capacitors C1, C2. The active balancing circuit works to keep this voltage constant at half DC-link voltage despite the two capacitor C1, C2 branches having leakage currents that differ by a factor of more than 3 from each other.

The second plot from the bottom shows the currents that flow in each of the parallel branches. The top line refers to the current through Rd2 and the bottom line to the current through Rd1. At Rs1=Rs2=0 or some very small value, the currents differ from each other. As the resistances Rs1 and Rs2 are increased, the currents start to merge toward the same value, in effect sharing the total current well with each other.

The plot in the middle of FIG. 3 shows the Vge voltage applied on each transistor FET1, FET2. It confirms that the transistor FET1, FET2 with lower threshold voltage has also lower Vge applied when Rs2 and Rs1 have some non-zero value.

The two upper plots in FIG. 3 show the power dissipation in transistors FET1, FET2 and resistors Rd1 and Rd2. Clearly, as the resistance value of resistors Rs2 and Rs1 is increased, the power dissipations start to merge toward each other, improving the balance between the two parallel branches of the active circuit.

Figure 4:
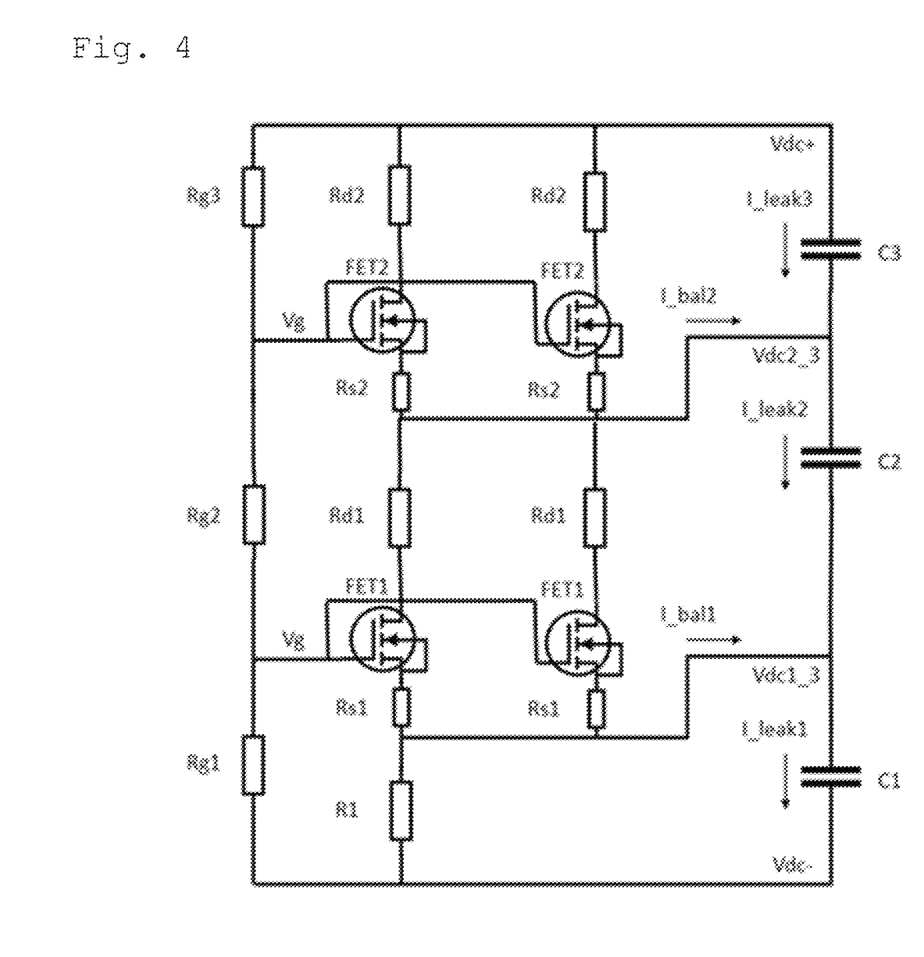
FIG. 4: serial emitter follower balancing circuits having serial coupled DC link capacitors.

FIG. 4 shows the serial emitter follower balancing circuits FET1, FET2 having serial coupled DC link capacitors C1, C2, C3. The serial coupling of the DC link capacitors C1, C2, C3 may comprise three or more capacitors to withstand high DC-link voltage of say 750 Vdc and where capacitor max voltage rating of a single capacitor cannot meet the requirement or may just not be feasible to use in terms of size, price, performance, and/or availability.

Figure 5:
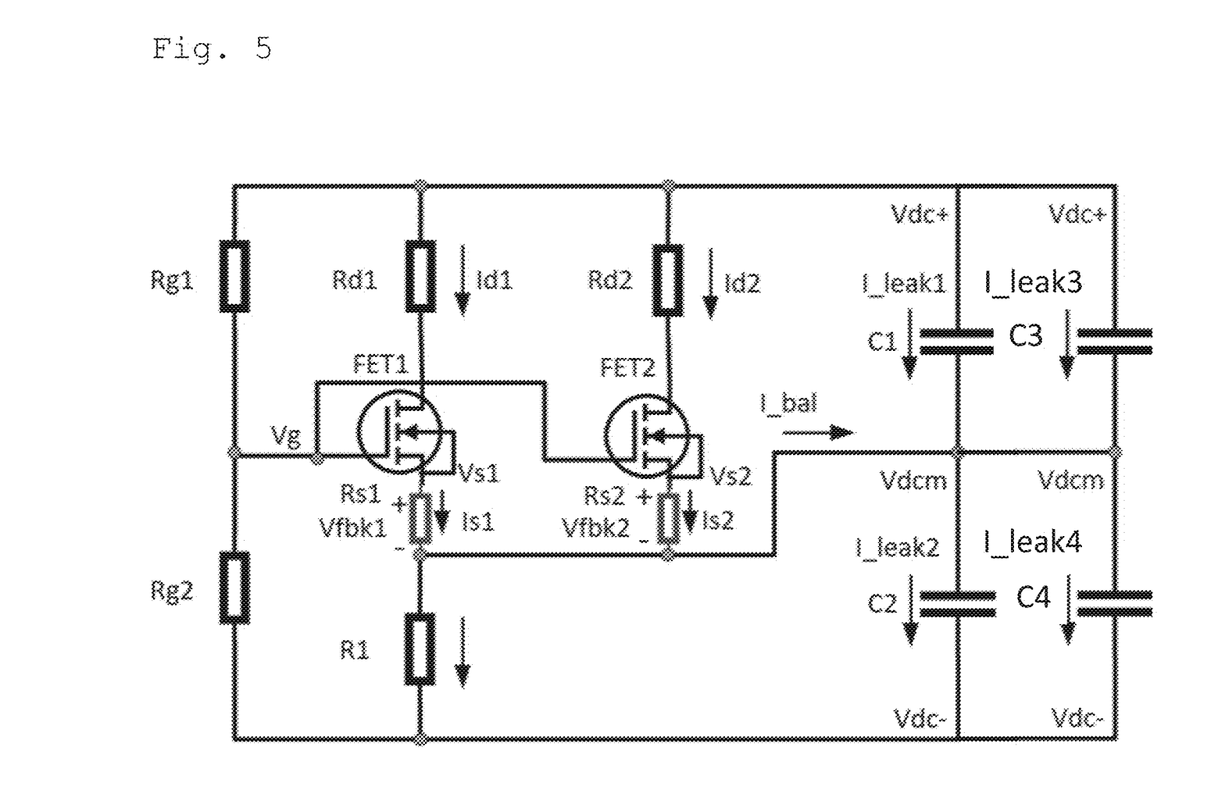
FIG. 5: parallel emitter follower balancing circuits having parallel coupled DC link capacitors.

FIG. 5 shows the parallel emitter follower balancing circuits FET1, FET2 having parallel coupled DC link capacitors C1, C2, C3, C4. The parallel coupling of DC-link capacitors may comprise two or more DC-link capacitors coupled in parallel with C1, C2 in order to get higher capacitance than C1, C2 can offer on their own. The price, size, performance, and/or availability may be reasons for coupling more DC-link capacitors in parallel.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A voltage balancing circuit for capacitor banks or voltage cells connected in series, comprising a DC-link with at least two capacitors or voltage cells connected in series and at least two emitter follower balancing circuits connected in parallel, wherein at least one emitter resistor is provided between the emitter of each emitter follower balancing circuit and the mid-point of the DC-link.

2. Voltage The voltage balancing circuit according to claim 1, wherein three, four or more parallel emitter follower balancing circuits are provided.

3. The voltage balancing circuit according to claim 1, wherein at least one common resistor connects the emitter resistors to the negative DC-link side.

4. The voltage balancing circuit according to claim 1, wherein the parallel emitter follower balancing circuits comprise IGBTs and/or MOSFETs.

5. The voltage balancing circuit according to claim 1, wherein the capacitor banks or voltage cells comprise battery cells and/or fuel cells and/or capacitors.

6. The voltage balancing circuit according to claim 5, wherein the battery cells and/or fuel cells and/or capacitors are arranged in parallel and/or in series to each other.

7. The voltage balancing circuit according to claim 1, wherein at least three capacitors or voltage cells are connected in series to each other and/or that at least two capacitors or voltage cells are connected in parallel to at least two other capacitors or voltage cells.

8. The voltage balancing circuit according to claim 1, wherein the voltage balancing circuit is integrated in a variable frequency drive for driving an electric motor.

9. The voltage balancing circuit according to claim 1, wherein the voltage balancing circuit is integrated in a power converter to supply a load.

10. A variable frequency drive for driving an electric motor or power converter for supplying a load, comprising the voltage balancing circuit according to claim 1.

11. The voltage balancing circuit according to claim 2, wherein at least one common resistor connects the emitter resistors to the negative DC-link side.

12. The voltage balancing circuit according to claim 2, wherein the parallel emitter follower balancing circuits comprise IGBTs and/or MOSFETs.

13. The voltage balancing circuit according to claim 3, wherein the parallel emitter follower balancing circuits comprise IGBTs and/or MOSFETs.

14. The voltage balancing circuit according to claim 2, wherein the capacitor banks or voltage cells comprise battery cells and/or fuel cells and/or capacitors.

15. The voltage balancing circuit according to claim 3, wherein the capacitor banks or voltage cells comprise battery cells and/or fuel cells and/or capacitors.

16. The voltage balancing circuit according to claim 4, wherein the capacitor banks or voltage cells comprise battery cells and/or fuel cells and/or capacitors.

17. The voltage balancing circuit according to claim 2, wherein at least three capacitors or voltage cells are connected in series to each other and/or that at least two capacitors or voltage cells are connected in parallel to at least two other capacitors or voltage cells.

18. The voltage balancing circuit according to claim 3, wherein at least three capacitors or voltage cells are connected in series to each other and/or that at least two capacitors or voltage cells are connected in parallel to at least two other capacitors or voltage cells.

19. The voltage balancing circuit according to claim 4, wherein at least three capacitors or voltage cells are connected in series to each other and/or that at least two capacitors or voltage cells are connected in parallel to at least two other capacitors or voltage cells.

20. The voltage balancing circuit according to claim 5, wherein at least three capacitors or voltage cells are connected in series to each other and/or that at least two capacitors or voltage cells are connected in parallel to at least two other capacitors or voltage cells.

* * * * *